Sept. 13, 1966 R. J. GELINAS 3,271,897
AQUATIC DISPLAY DEVICE
Filed Jan. 7, 1964
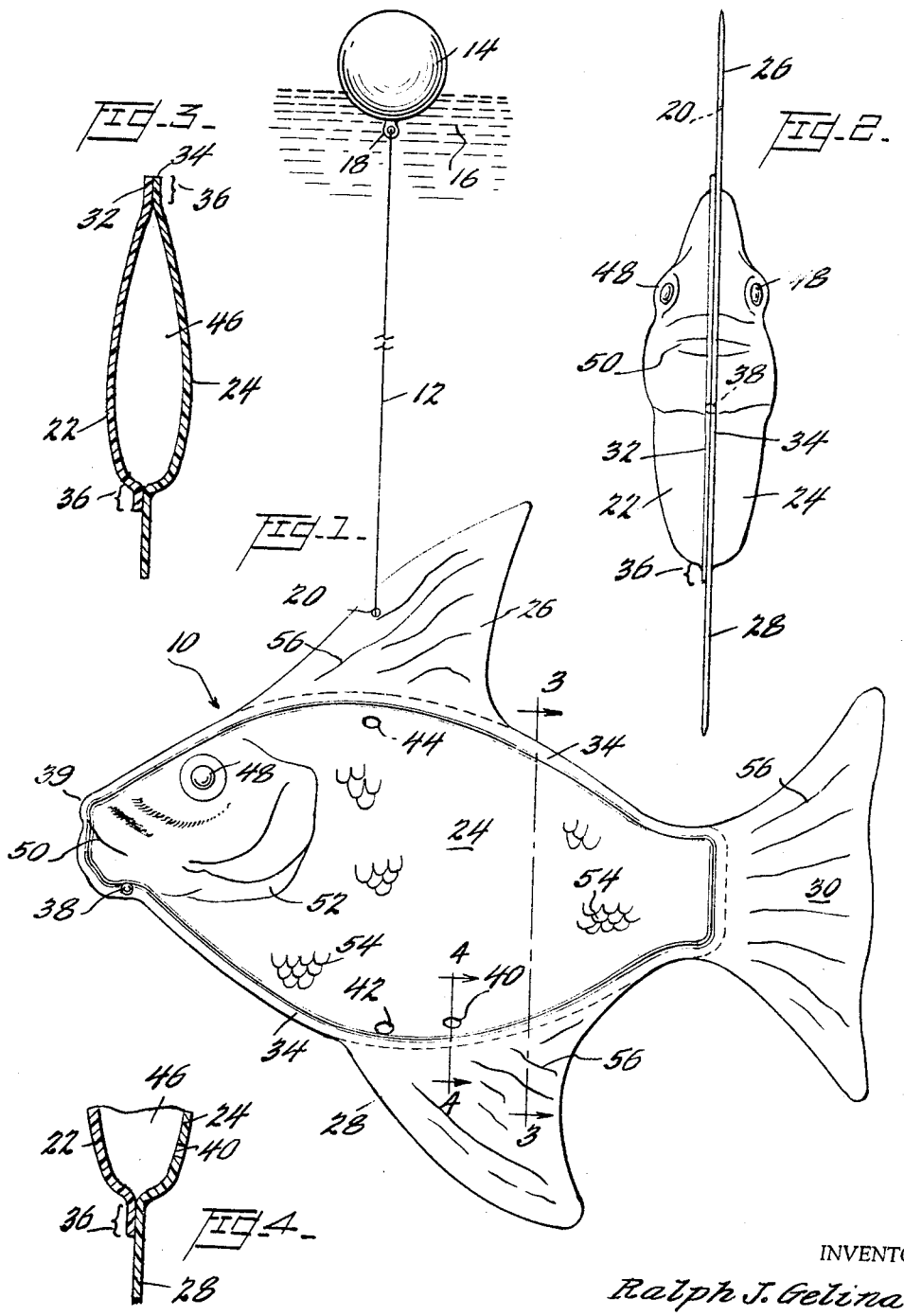
INVENTOR
Ralph J. Gelinas,
Misegades & Douglas
BY
by Keith Misegades
ATTORNEYS

United States Patent Office 3,271,897
Patented Sept. 13, 1966

3,271,897
AQUATIC DISPLAY DEVICE
Ralph J. Gelinas, 5907 Sepulvida Blvd., Van Nuys, Calif.
Filed Jan. 7, 1964, Ser. No. 336,303
3 Claims. (Cl. 46—92)

This invention relates to aquatic display devices and in particular to a device for submerged display in a relatively small body of water and adapted to be given limited movement by currents within the water so as to simulate the natural movements of aquatic creatures.

The invention has particular utility in swimming pools, small ponds, fountains, or the like, where some circulation of water is present and it is desirable to place objects of esthetic beauty therein to enhance the natural beauty of such small bodies of water. There are some display devices on the market today designed for this purpose, including those adapted to float on the surface of a body of water or held immediately below said surface. There are few designed to simulate aquatic life but none adapted for movement in a liquid medium without extra mechanical assistance.

Therefore, it is an object of the present invention to provide an aquatic display device adapted for submerged use as an article of realistic beauty.

It is another object of this invention to provide a submerged aquatic display device movable in a liquid medium by action of the currents therein.

Still another object is to provide a submerged aquatic display device movable in a liquid medium by action of the currents therein upon specified structural portions of the device.

Yet another object is to provide a submerged aquatic display device adapted for movement while maintaining a proper, stable attitude with respect to the body of water wherein the device is placed.

Another object of this invention is to provide a float-suspended submerged aquatic display device having a specific gravity slightly greater than that of the surrounding liquid medium.

An additional object of the invention is to provide a submerged aquatic display device having a hollow body portion designed to be filled by the surrounding medium.

Finally, it is an object of the invention to provide a submerged aquatic display device of high esthetic quality and low in cost of manufacture.

The specific construction and function of one particular embodiment of the invention may be had by reference to the following specification and drawings in which:

FIGURE 1 is an elevational view of the invention in the form of a fish;

FIGURE 2 is a front view of the structure of FIGURE 1;

FIGURE 3 is a partial section taken along line 3—3 of FIGURE 1; and

FIGURE 4 is another partial section taken along line 4—4 of FIGURE 1.

Referring now to the drawing by reference numeral, and in particular to FIGURE 1, the invention comprises a body portion 10 in the form of a fish suspended by a line 12 secured to a float 14 riding on the surface of a body of water 16. Line 12 is secured to body 10 through a hole 20, and to float 14 through a screweye 18 secured thereto. Body 10 is maintained at a depth within water 16 sufficient to import realism to the appearance of the fish. Thus the length of line 12 is determined by the natural characteristics of the creature represented by body 10. It is also desirable that line 12, float 14 and screweye 18 be transparent so as not to interfere with the realistic appearance of body 10.

Body 10 is formed from two sections 22 and 24, of thermoplastic or other suitable material. Any slightly pliable material is suitable for present purposes. In addition, the sections are silk-screened in various colors for added esthetic value. Polyvinyl plastic has been selected here, as it may be easily and permanently formed and colored. Section 22 comprises one-half of body portion 10, section 24 with fins 26, 28 and 30 forming the remaining half. Section 22 is further provided with a flat margin 32 that is cemented or heat-sealed to the mating portion 34 of section 24 in the region of overlap indicated at 36.

Dorsal fin 26, ventral fin 28, and caudal fin 30 may be integrally formed with section 24, or alternatively, be secured to preformed section 22 or 24. In the present instance, the fins are formed integrally with section 24 of pliable material. Preferably, the fins will be pliable enough to appear life-like as they are moved by normal circulation of water 16, and yet stiff enough to control the attitude of body portion 10 as it is moved. Further stability of the device may be assured by a small weight 38 added to nose 39 of body 10.

One body portion 24 is provided with fill openings 40 and 42 near ventral fin 28, and a fill and vent opening 44 located near dorsal fin 26. To operate the device, it is only necessary to place the body 10 in water 16, gently squeezing sides 22 and 24 so that interior portion 46 fills with water. A gentle rocking motion will facilitate removal of all air through vent opening 44. The device is then released and maintained at a depth determined by the length of line 12.

As referred to above, the device is given slight movement by action of the circulatory motion of the body of water 16. It will be observed by reference to the drawings that the construction of body 10 is generally flat. This feature, together with the substantially large fins 26, 28 and 30 allows body 10 to be easily affected by any cross-currents within water 16. In the preferred embodiment of the invention the combined surface area of the fins is at least equal to the surface area of the body 10 in order that the device may be readily affected by even the smallest current present within water 16. However, the size of the fins in proportion to that of the body need only be enough to allow the device to be satisfactorily affected by circulation of water 16.

Once the device is subjected to circulatory movement, it is desired that the body portion travel in the direction of its length, as marine creatures rarely swim in the direction of their width. For this reason, the device is constructed as a weather vane, having a broad tail area to be affected by circulation, an axis formed by line 12 about which the body may rotate, and a nose 39 to point in the direction of the current affecting the device. For this reason, line 12 is secured to body 10 in the approximate vertical axis of symmetry thereof, but longitudinally toward one side of the center of gravity of body 10, oppositely of tail fin 30. Thus weight 38 serves to stabilize the device while offsetting the effect caused by the placement of line 12. When the body is struck by a current, a "weather vane" motion will ensue causing nose 39 to point in the direction of the current.

For maximum realism, it is desirable that the various features of body 10 be carefully structured. The eyes 48, mouth 50 and gills 52 should either be applied to the material of the body or be a part of the material in the event polyvinyl plastic is used. Scales 54 and dermal rays 56, applied as above, will heighten the appearance. When one or several of the devices are used in a fountain or pool equipped with underwater lighting, meticulous attention to coloration as previously discussed will lend a startling effect of beauty and reality.

While the above serves as a specific embodiment of the invention, it is clear that many varieties may be produced without departing from the intended scope of the invention. While I have chosen to show the invention in the form of a fish, many other varieties of marine life may be represented, providing only that they be formed with fin-like elements of the proportions above indicated so as to provide stability to the structure as it is moved by the circulatory motion of the body of water in which it is submersed. Therefore, I am not to be limited to the specific structure hereinbefore described except as may be within the scope of the following claims.

I claim:

1. An aquatic display device for use in water having currents therein comprising a float, a line and a submerged body secured to said line, said body being formed of at least two sections of pliable plastic material forming a cavity within said body, at least one fill hole along the bottom of said body and at least one vent hole along the top of said body to provide access to said cavity by said water for display of said device, said body having a plurality of vane elements projecting therefrom, the combined surface area of said vane elements being substantial with respect to the area of said body, said body movable through said water by action of said currents upon said vane elements, the specific gravity of said body being slightly greater than that of water.

2. The device of claim 1 wherein the specific gravity of said float is substantially less than that of water, said float additionally having a spherical configuration so as to provide minimum drag when said device is moved by said currents.

3. The device of claim 1 wherein said body is provided with a weight at one longitudinal end thereof, said line secured to said body above the center of gravity of said body with said weight, said vane elements and a major portion of said body located otuside of said center of gravity, opposite said weighted end, said line forming a vertical axis of rotation of said body and weight, said rotation induced by action of said currents on said vane elements and major portion.

References Cited by the Examiner
UNITED STATES PATENTS

| | | | |
|---|---|---|---|
| 2,546,516 | 3/1951 | Nardi | 43—42.22 X |
| 2,994,982 | 8/1961 | Murawski | 43—35 |
| 3,085,361 | 4/1963 | Rhodes | 46—92 X |

RICHARD C. PINKHAM, *Primary Examiner.*

F. B. LEONARD, L. J. BOVASSO, *Assistant Examiners.*